United States Patent
Hiraishi et al.

(10) Patent No.: US 7,686,496 B2
(45) Date of Patent: Mar. 30, 2010

(54) LIGHT GUIDE PLATE, SURFACE LIGHT SOURCE DEVICE AND IMAGE DISPLAY

(75) Inventors: Fuminori Hiraishi, Tokyo (JP); Takahiro Aome, Tokyo (JP)

(73) Assignee: Enplas Corporation, Kawaguchi-Shi (JP)

( * ) Notice: Subject to any disclaimer, the term of this patent is extended or adjusted under 35 U.S.C. 154(b) by 170 days.

(21) Appl. No.: 11/896,767

(22) Filed: Sep. 5, 2007

(65) Prior Publication Data
US 2008/0151578 A1 Jun. 26, 2008

(30) Foreign Application Priority Data
Sep. 5, 2006 (JP) .............................. 2006-239925

(51) Int. Cl.
*F21V 7/04* (2006.01)
(52) U.S. Cl. .......................... 362/620; 362/616; 349/65
(58) Field of Classification Search ................. 362/336, 362/337, 600, 606, 608, 610, 611, 612, 613, 362/615, 616, 617, 619, 620, 621; 349/61, 349/62, 65, 70, 71
See application file for complete search history.

(56) References Cited

U.S. PATENT DOCUMENTS

| | | | | |
|---|---|---|---|---|
| 6,986,600 B2 * | 1/2006 | Yamada et al. | ............... | 362/626 |
| 7,223,006 B2 * | 5/2007 | Sugiura | ....................... | 362/616 |
| 7,309,153 B2 * | 12/2007 | Arihara | ....................... | 362/615 |
| 7,374,329 B2 * | 5/2008 | Feng et al. | ................... | 362/626 |
| 7,465,083 B2 * | 12/2008 | Ohkawa | ....................... | 362/616 |
| 2002/0172032 A1 * | 11/2002 | Munro et al. | ................. | 362/31 |
| 2006/0171167 A1 | 8/2006 | Ohkawa | | |

FOREIGN PATENT DOCUMENTS

| | | |
|---|---|---|
| JP | 2005-259361 | 9/2005 |
| WO | 2004/079258 | 9/2004 |

* cited by examiner

*Primary Examiner*—Hargobind S Sawhney
(74) *Attorney, Agent, or Firm*—Staas & Halsey LLP

(57) ABSTRACT

A light guide plate has an emission face provided with a plurality of projection rows. Each projection row consists of a pair of slopes, a first slope (a slope far from an incidence end face) and a second slope (another slope near to the incidence end face). An inclination angle of the first slope with respect to an imaginary plane perpendicular to a frontal direction decreases gradually in first region on the emission face (or back face) according to an increasing distance from the incidence end face, then increasing gradually in second region according to an increasing distance from the incidence end face. The inclination angle at an incidence-end-face-side end of first region is greater that at a distal-end-face-side end of second region. Variation of the inclination angle in the first region is greater that in the second region.

10 Claims, 11 Drawing Sheets

FIG. 4
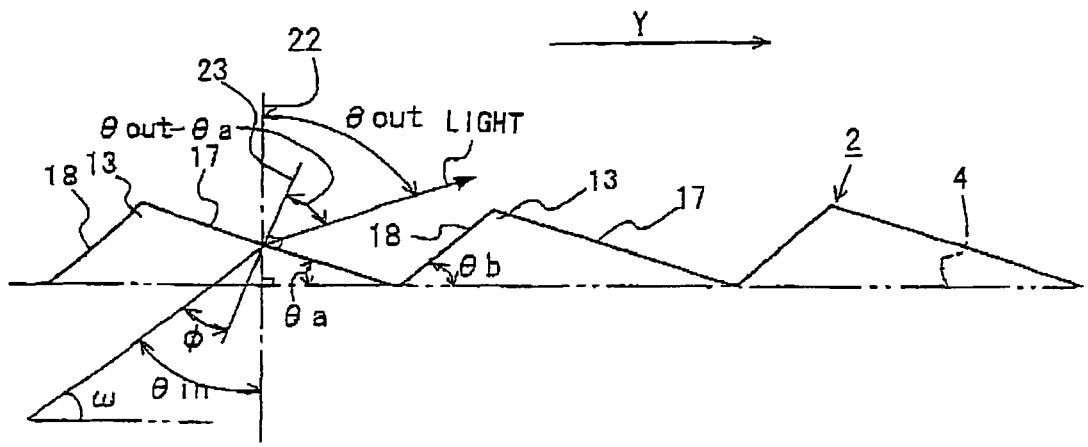
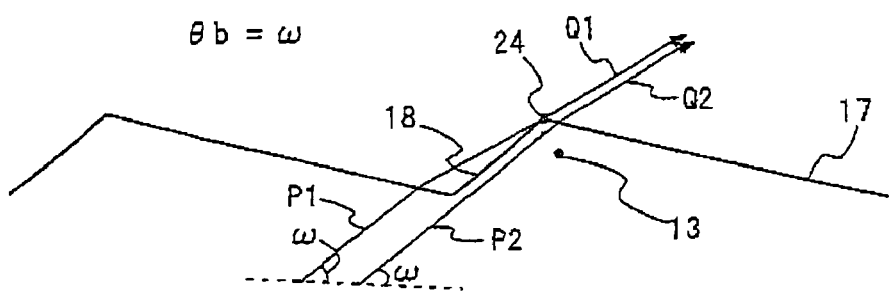
FIG. 5a
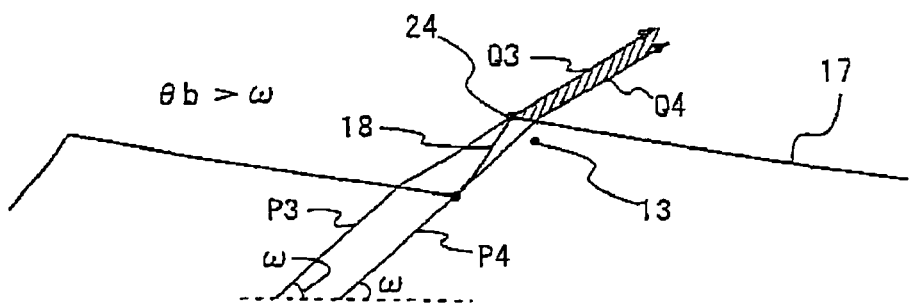
FIG. 5b

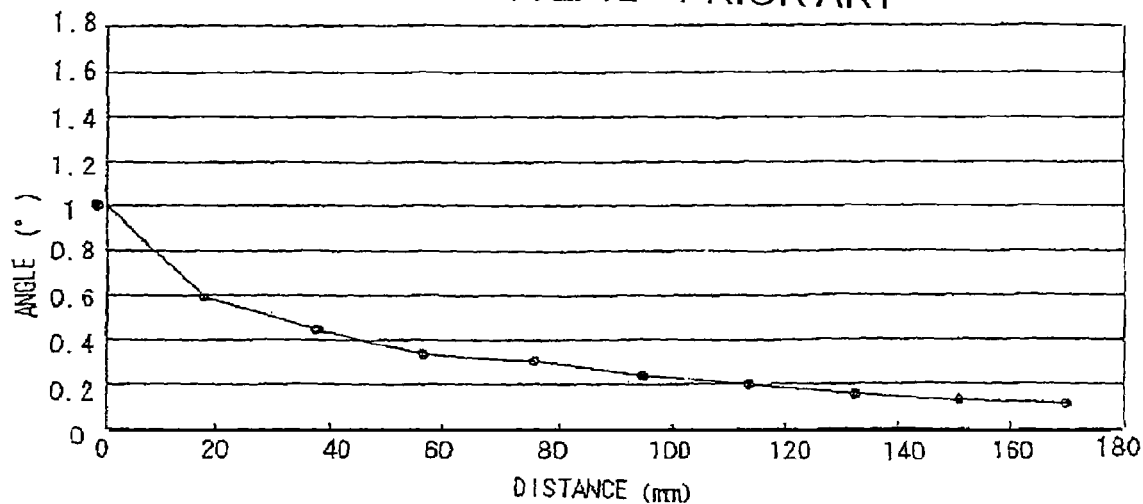
FIG. 12 -- PRIOR ART
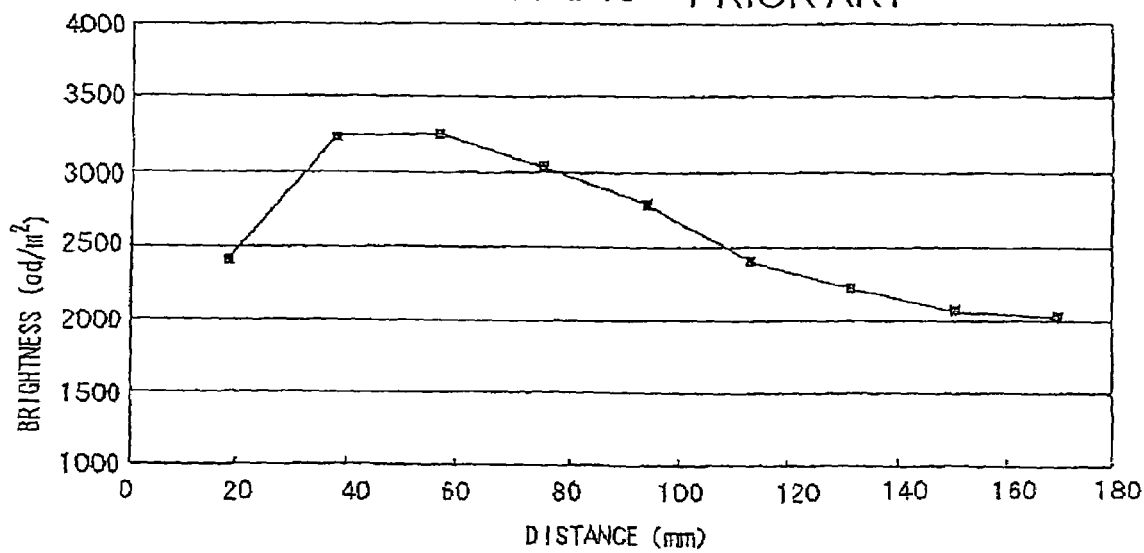
FIG. 13 -- PRIOR ART h1 < h2
h3 < h2

FIG. 16
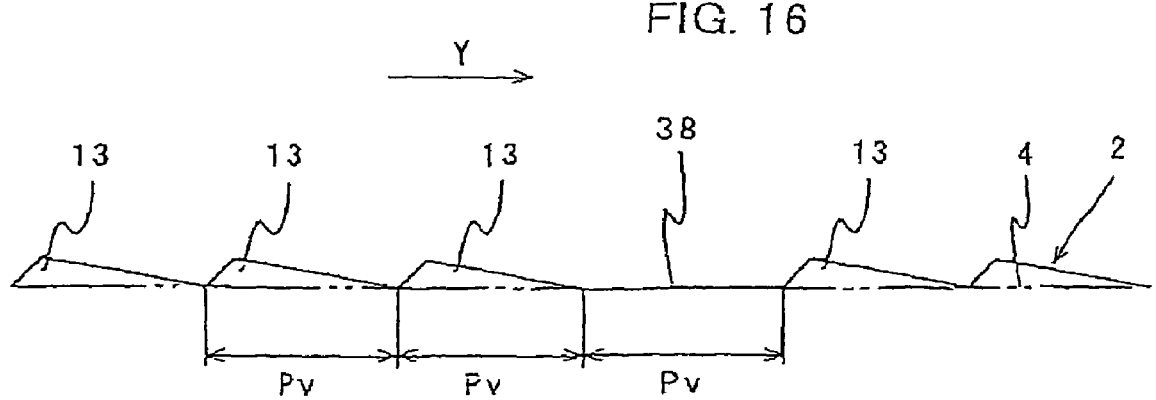
FIG. 17 -- PRIOR ART
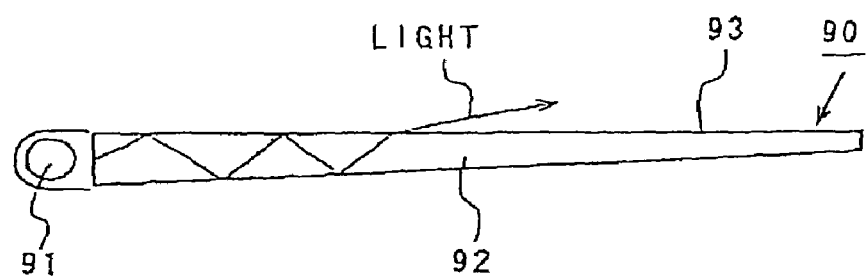

FIG. 18 -- PRIOR ART
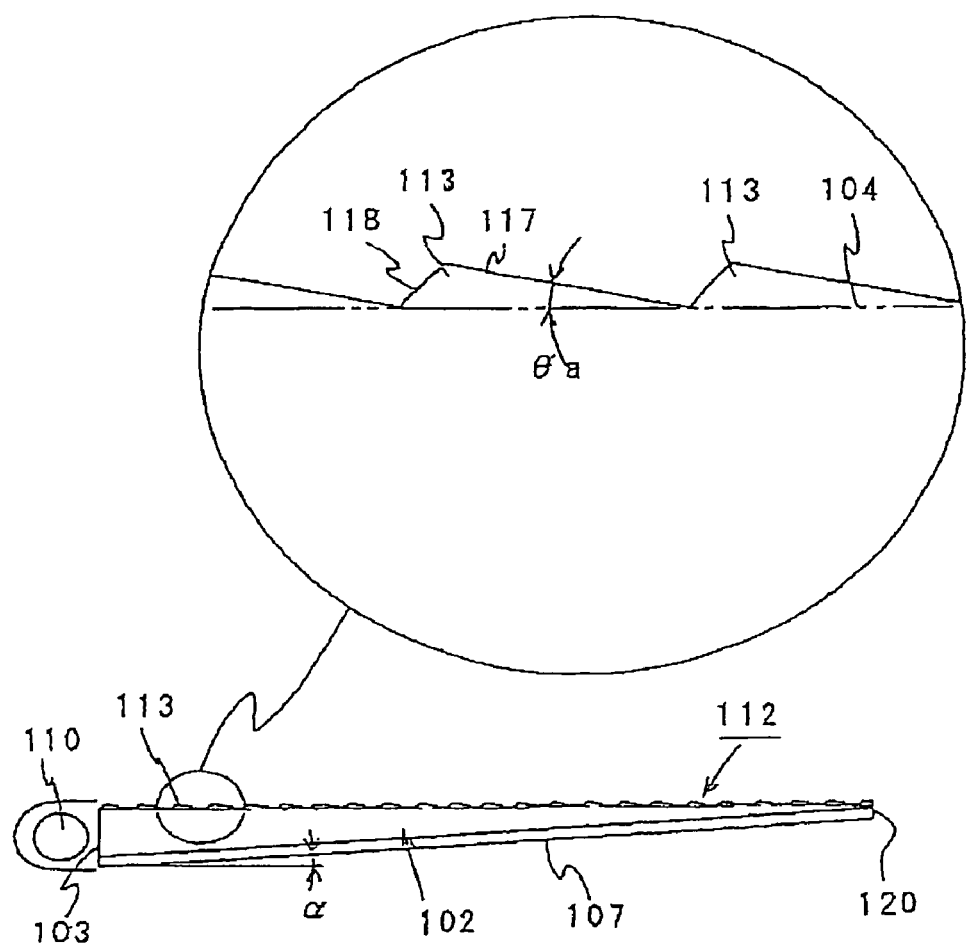
FIG. 19 -- PRIOR ART
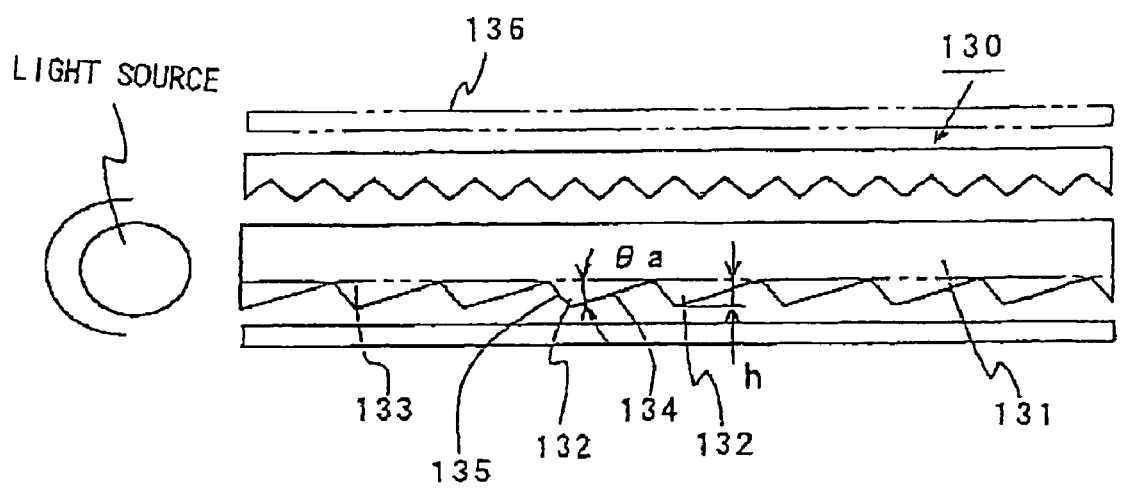

LIGHT GUIDE PLATE, SURFACE LIGHT SOURCE DEVICE AND IMAGE DISPLAY

BACKGROUND

1. Field of Invention

The present invention relates to a light guide plate and surface light source device provided with the light guide plate, and to an image display provided with the surface light source device. The present invention is applied to an image display provided with a member-to-be-illuminated (object-to-be-illuminated) such as image display panel backlighted by a surface light source device, and to a surface light source device and light guide plate used therein. A light guide plate, surface light source device and image display in accordance with the present invention may be used for image displaying in portable phones, portable terminals, electric dictionaries, various electronic devices or personal computers.

2. Related Art

It is known well to use liquid crystal displays for image displaying in portable phones, personal computers or other devices. A liquid crystal display is provided with a liquid crystal display panel as a member-to-be-illuminated. In many cases, backlighting is applied to the liquid crystal display panel and a so-called side light type surface light source device is utilized for backlighting.

FIG. 17 is a cross section view of a well-known fundamental structure of a side light type surface light source device, wherein a light path, which is depicted while primary light (i.e. light from a primary light source) enters into a light guide plate and then is emitted, is shown additionally.

Referring to FIG. 17, surface light source device 90 is provided with light source (primary light source) 91 and light guide plate 92. Light from light source 91 enters into light guide plate 9 92 sideways, propagating within light guide plate 9 92. On the way of such inner-propagation, inner-incidence to emission face 93 of light guide plate 92 occurs repeatedly. If inner-incidence angle is not greater than critical angle, some of inner-incident light outgoes from emission face 93. It has been proposed recently to aim to obtain uniformalized and highly bright emission from an emission face of a light guide plate by forming prismatic projections having emission promotion function on the emission face.

FIG. 18 shows an example thereof (first prior art), which is disclosed in Document 1 noted below. Referring to FIG. 18, surface light source device 112 is provided with light guide plate 102 and light source (primary light source) 110. Light guide plate 102 has an emission face 104 on which a great number of prismatic projection rows 113 running in a direction along incidence face 103 of light guide plate 102. These projection rows 113 promote outgoing of inner-propagation light in light guide plate 102.

Each projection row 113 is a prismatic projection having a triangle-like cross section, being provided with first slope 117 and second slope 118. First slope 117 is gently inclined so that light guide plate 102 decreases in thickness with an increasing distance from incidence face 103. On the other hand, second slope 118 is sharply inclined so that light guide plate 102 increases in thickness with an increasing distance from incidence face 103. On the other hand, Area occupied by first slope 117 is greater than area occupied by second slope 118. In addition, inclination angle θa of first slope 117 gets smaller gradually from incidence face 103 to distal end face 120. This and inclination of angle (wedge angle) α made by back face 107 of light guide plate 102 with respect to emission face 104 results in a cooperative effect such that emission from emission face 104 has a high and uniform brightness.

Next, FIG. 19 shows another prior art (second prior art), which is disclosed in Document 2 noted below. The second prior art aims to uniformalize and heighten emission brightness in generally the same manner as the first prior art (FIG. 18).

Referring to FIG. 19, surface light source device 130 employs light guide plate 131. Light guide plate 131 has back face 133 on which a great number of prismatic projection rows 132 are formed.

All projection rows 132 of light guide plate 131 shown in FIG. 19 gives the same inclination angle θa of first slopes 134 while intervals between two projection rows 132, 132 adjacent to each other varies in a suitable manner. This causes area ratio relation between first slope 134 and second slope 135 and height h of projection row 113 $h$ to vary.

Document 1; International Laid-open pamphlet 2004/079258.

Document 2; Tokkai 2005-259361 (JP)

However, the above-mentioned first prior art fails to achieve sufficiently high and uniform emission brightness, for example, in cases as follows.

(1) Cases where inclination angle α of back face 107 of light guide plate 102 can not designed flexibly due to limitation, such as thickness, size or others, which light guide plate 102 is subject to.

(2) Cases where emission face 104 has short of emission ability depending on position thereon under condition such that inclination angle α is constant.

Although known are arts according to which emission face 104 or back face 107 is roughened in order to compensate short of emission ability, such arts causes, in general, emission face 104 to have a reduced emission directivity and, with the result that high brightness is hardly obtained.

According to the above-mentioned second prior art, intervals between two prismatic projection rows 132 adjacent to each other vary appropriately in order to uniformalize emission brightness, failing to enable individual projection rows to have an adjusted emission promotion ability due to absence of configuration variation thereof. Therefore, it is difficult to avoid emission face 104 from having control short or excess of emission brightness which can occur depending on position thereon,

OBJECT AND SUMMARY OF INVENTION

An object of the present invention, is to improve a light guide plate of a type having prismatic projection rows and being supplied with primary light from a side end portion so that an emission face can provide a high and uniform illumination emission without reducing emission directivity under being supplied with primary light from the side end portion.

Another object of the present invention, is to provide a surface light source device capable of outputting a high and uniform illumination light with a high emission directivity by employing the above improved light guide plate.

under being supplied with primary light from the side end portion.

Still another object of the present invention, is to provide an image display capable of performing high-quality and bright image displaying by employing the surface light source device.

First, the present invention is applied to "a light guide plate comprising an incidence end face provided by a first minor face, a distal end face provided by a second minor face opposite to said incidence end face, an emission face provided by a first major face and a back face provided by a second major face opposite to said emission face, light incident to said incidence end face being emitted from said emission face on the way of propagating within said light guide plate.

The light guide plate in accordance with the present invention is provided with a first feature or a second feature.

According to the first feature, a great number of prismatic projection rows are formed on said emission face or said back face as to run across a light supply direction toward said distal end face from said incidence end face and each of said great number of projection rows is formed of a first slope and a second slope which meet each other to provide a ridge line, said second slope being located nearer than said first slope to said incidence end face, and said emission face or said back face on which said great number of projection rows are formed being provided with a first region and a second region that is remote than said first region from said incidence end face, and said first slope gives inclination angle θa with respect to an imaginary plane perpendicular to a frontal direction of said emission face as to satisfy the following Conditions 1 to 3.

Condition 1; Inclination angle θa decreases gradually in said first region according to an increasing distance from said incidence end face and increases gradually in said second region according to an increasing distance from said incidence en.

Condition 2; Inclination angle θa at the nearest position to said incidence end face in said first region is greater than inclination angle θa at the nearest position to said distal end face in said second region.

Condition 3; Variation Δ(1)θa of inclination angle θa within said first region is greater than variation Δ(2)θa of inclination angle θa within said second region.

Said great number of projection rows may provide a great number of valley bottom lines formed at a constant interval between two projection rows which are included in said great number of projection rows and located adjacent to each other. In addition, said great number of projection rows may provide a great number of ridge lines formed at a constant interval.

Next, according to the second feature, a great number of prismatic projection rows are formed on said emission face or said back face as to run across a light supply direction toward said distal end face from said incidence end face and each of said great number of projection rows is formed of a first slope and a second slope which meet each other to provide a ridge line, said second slope being located nearer than said first slope to said incidence end face, and said emission face or said back face on which said great number of projection rows are formed being provided with a first region and a second region that is remote than said first region from said incidence end face, and said first slope gives inclination angle θa with respect to an imaginary plane perpendicular to a frontal direction of said emission face as to satisfy the following Conditions 4 to 6.

Condition 4; Under definition such that θa1, θa2, . . . , θan are inclination angle angles θa of n (where n is positive integer not smaller than 2) projection rows which are included in said great number of projection rows and arranged successively and average inclination angle θm is defined as {θa1+θa2+ . . . θan)/n}, average inclination angle θm decreases gradually in said first region according to an increasing distance from said incidence end face and increases gradually in said second region according to an increasing distance from said incidence en.

Condition 5; Under definition such that θm(3) is defined as said average inclination angle θm when n=3, θm(3) for three projection rows located nearer than the other projection rows in said first region to said incidence end face is greater than θm(3) for three projection rows located nearer than the other projection rows in said second region to said distal end face.

Condition 6; Variation θm(31) of said θm(3) within said first region is greater than variation θm(32) of said θm(3) within said second region.

The present invention is also applied to a surface light source device comprising a light guide plate, a primary light source and a light control member.

The surface light source device in accordance with the present invention employs any light guide plate provided with the above first feature or second feature. The light control member is disposed along an emission face of the light guide plate and said primary light source supplies light toward said incidence end face of said light guide plate.

The present invention is further also applied to an image display comprising a surface light source device; and a member-to-be-illuminated illuminated by light outputted from said surface light source device. The image display in accordance with the present invention employs any surface light source device in accordance with the present invention.

According to a light guide plate or surface light source device, emission is intensively promoted in the vicinity of an incidence end face where a large short of emission intensity would be apt to occur. In addition, emission is also promoted to a certain extent in the vicinity of a distal end face where a small short of emission intensity would be apt to occur. Therefore, it is easily realized to uniformalize emission intensity (in particular, uniformalization in the first and second regions). Uniformalization of brightness can be performed without relying upon light diffusing or light scattering. As a result, Uniformalization of brightness can be achieved without reducing emission directivity.

Further, a great number of projection rows employed in the present invention can render manufacturing of light guide plates easy because ridge lines or valley lines can be disposed at a constant interval. Still further, an image display in accordance with the present invention has a member-to-be-illuminated which is irradiated by uniform and highly bright illumination light from a surface light source device. Thus bright and clear screen display can be realized.

BRIEF DESCRIPTION OF DRAWINGS

FIG. 2a is a cross section view of the liquid crystal display shown in FIG. 1 along line A-A and FIG. 2b is an enlarged view of part-B shown in FIG. 2a;

FIG. 4 is an enlarged view of an emission face side of light guide plate;

FIGS. 5a and 5b are illustrations for explaining causes of dark portion appearance in the vicinity of boundary between first and second slopes forming projection rows on an emission face side of a light guide plate, FIG. 5a illustrating behaviour of a main light beam in a case where angle θb is equal to angle ω, and FIG. 5b illustrating behaviour of a main light beam in a case where angle θb is greater than angle ω;

FIG. 12 is a graph showing a relation between distance from an incidence end face of a light guide plate in accordance with a prior art (abscissa) and inclination angle θa of first slope of a projection row (ordinate);

FIG. 13 is a graph showing a relation between distance from an incidence end face of the light guide plate in accordance with the prior art (abscissa) and emission brightness (ordinate);

ht guide plate, giving explanation on Modification 2 in accordance with the present invention;

FIG. 16 is an enlarged view of a part of an emission face of a light guide plate, giving explanation on Modification 2 in accordance with the present invention;

ht guide plate, giving explanation on Modification 2 in accordance with the present invention;

FIG. 17 is a diagramic view of a conventional surface light source device;

FIG. 18 is a diagramic view of a surface light source device in accordance with a first prior art; and FIG. 19 is a diagramic view of a surface light source device in accordance with a second prior art.

EMBODIMENT

Figure 1:
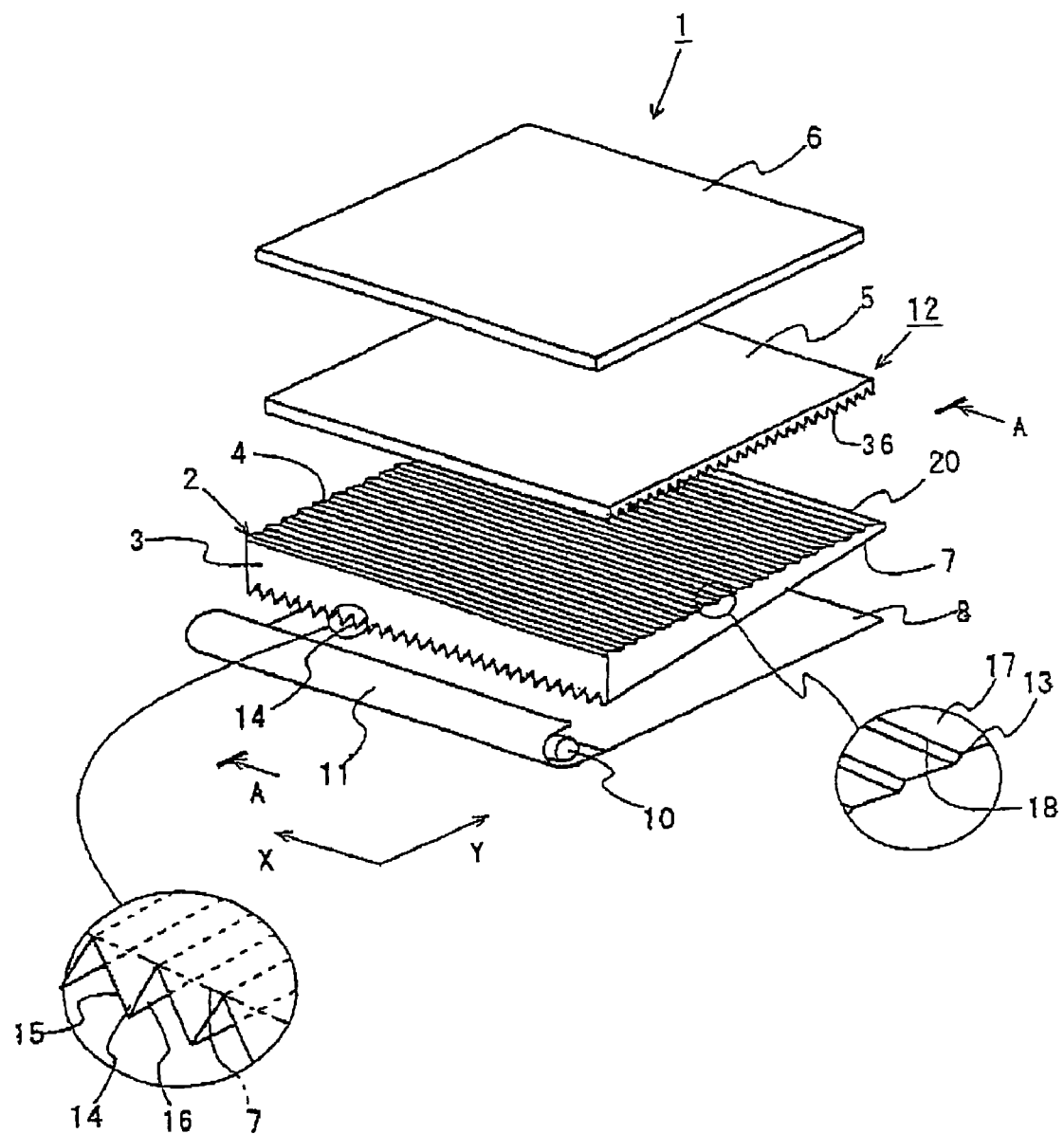
FIG. 1 is an exploded perspective view of a liquid crystal display of a first embodiment in accordance with the present invention.

Hereafter is described on embodiments in accordance with the present invention on the basis of the drawings. FIGS. 1 to 3 shows liquid crystal display (an example of image display) 1 in accordance with the present invention.

Figure 2A:
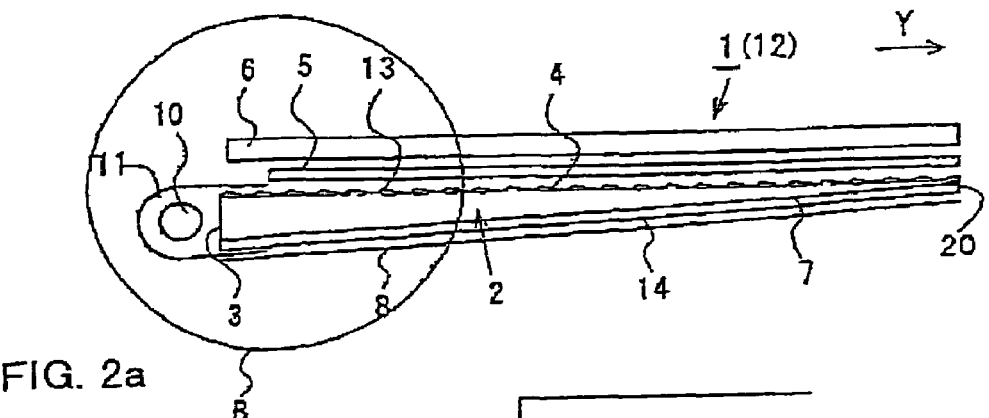
Figure 3:
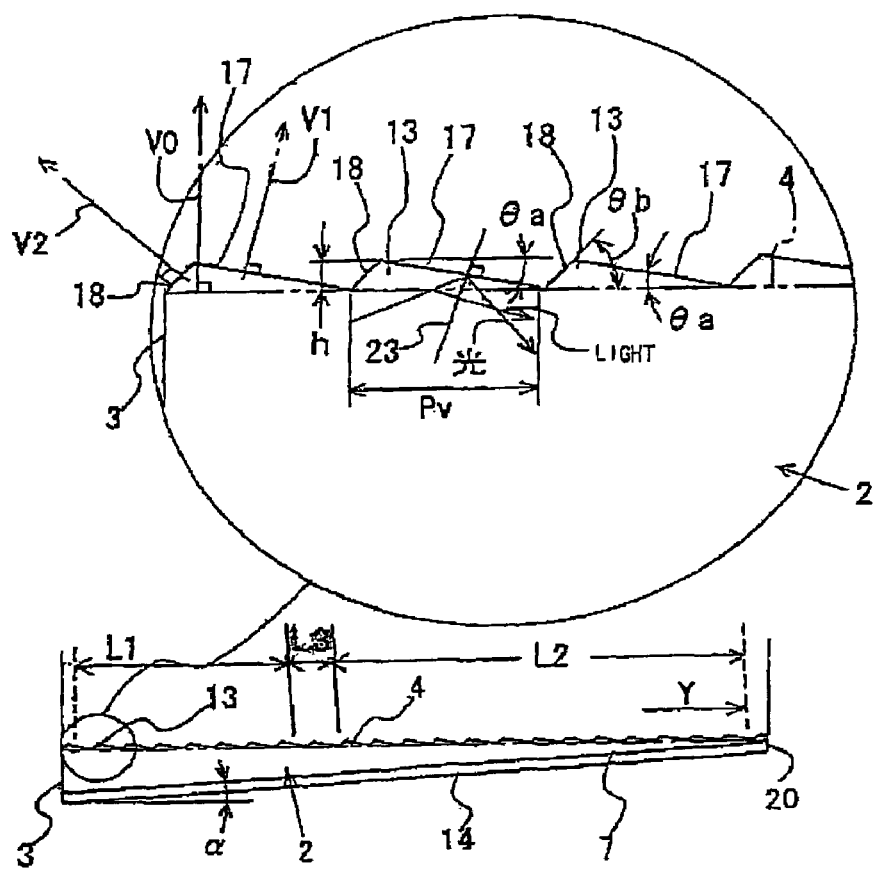
FIG. 3 is a cross section view of a light guide plate (shown in FIG. 2) employed in the liquid crystal display of the embodiment in accordance with the present invention.

FIG. 1 is an exploded perspective view of liquid crystal display 1 and FIG. 2a is a cross section view of liquid crystal display 1 along a plane perpendicular to incidence face (i.e. incidence end face) 3 of light guide plate 2 (along line A-A). FIG. 3 is a cross section view of light guide plate 2 employed in liquid crystal display 1, giving description on surface configuration of light guide plate 2.

(Outlined Structure of LCD)

Liquid crystal display 1 includes surface light source device 12 and liquid crystal display panel (an example of member-to-be-illuminated) 6. Surface light source device 12 has reflection member 8, light guide plate 2, prism sheet 5, fluorescent lamp (an example of primary light source) 10 and lamp reflector 11. Liquid crystal display panel 6 is backlighted by surface light source device 12. It is noted that other light sources such as LE (Light Emitting Diode) or other light sources may be employed instead of fluorescent lamp 10.

Light guide plate 2 has emission face 4 provided by a major face (first major face). Back face 7 is provided by another major face (first major face) opposite to the first major face. Prism sheet 5 is disposed along emission face 4. Reflection member 8 is disposed along back face 7. Fluorescent lamp 10 is disposed along incidence face 3. Light of fluorescent lamp 10 (i.e. primary light) is incident to incidence end face 3 directly or after being reflected by lamp reflector 11.

The above-described basic structure is has been known well, being broadly applied to side-light-type surface light source devices and liquid crystal displays employing them. However, light guide plate 2 is novel as described below.

(Light Guide Plate)

Light guide plate 2 is made of a light permeable material such as polycarbonate (PC), polymethyl methacrylate (PMMA) or cycloolefin-type resin. Light guide plate 2 has a generally rectangular plan shape (emission face shape). Plate thickness decreases according to an increasing distance from incidence face 3, giving a wedge-like cross section to light guide plate 2.

An "imaginary plane" is defined as follows. This imaginary plane is a plane imaginarily extending in a "frontal direction" of emission face 4 of light guide plate 2 (i.e. just upward direction in FIG. 2). Although numerous such planes exist, here is adopted "imaginary plane representing emission face 4".

In other words, although many projection rows 13 are formed on emission face 4 in this embodiment as described later, a plane obtained by removing imaginarily projection rows 13 from emission face 4 is adopted as "imaginary plane". It can be said that this imaginary plane is a "general extending plane" of emission face 4. In addition, it can be also said that this imaginary plane is a "plane extending perpendicular to incidence end face 3 and in parallel with a length direction of incidence face 3". In such a way, imaginary plane substantially represents emission face 4 in this embodiment.

Thus two-dot chain line shown in FIG. 3 is an imaginary plane can be regarded as a plane expressing emission face 4. In addition, although prismatic projection rows 14 are formed overall on back face 7 of light guide plate 2, for the sake of explanation, back face 7 is represented by a plane (reference plane) obtained by removing imaginarily theses prismatic projection rows 14 are removed from back face 7.

This imaginarily prepared plane (back face 7) is inclined at inclination angle α as to be close to emission face 4 according to an increasing distance from incidence end face 3 (i.e. away from incidence end face 3 in Y-direction perpendicular to incidence face 3), as shown in FIG. 1 with two-dot line.

A great number of prismatic projection rows 14 formed on back face 7 run in a direction approximately vertical (for example, within a range of 90°±5°) to incidence face 3. Each of prismatic projection rows 14 has a triangle-like cross section in a plane parallel to incidence end face 3 and this triangle-like cross section is provided by a pair of slopes 15, 16.

Such prismatic projection rows 14 formed on back face 7 and functions of them are known well. That is, prismatic projection rows 14 perform light gathering function such that some of inner-propagation is inner-reflected and gathered around a frontal direction of emission face 4 in a plan parallel with incidence face 3.

Next given is description on a great number (for example, not smaller than 100) of projection rows 13 formed on emission face 4 of light guide plate 2. These projection rows 13 run in a direction crossing another direction from incidence end face 3 to distal end 20. In other words, projection rows 13 run in a direction generally parallel with incidence end face 3. Projection rows 13 are configured as follows.

Each projection row 13 has a triangle-like configuration in a cross section generally perpendicular to incidence end face 3. Each projection row 13 is consists of first slope 17 and second slope 18 nearer to incidence end face 3 than first slope 17. First slope 17 and second slope 18 meet mutually as to give a ridge line.

Therefore, normal direction V1 of first slope 17 is inclined to the side of distal end face side 20 with respect to frontal direction (i.e. normal direction of emission face 4) V0. On the other hand, normal direction V2 of second slope 18 is inclined to the side of incidence end face ace 3 with respect to a frontal direction V0. Pitch of ridge lines provided by two projection rows 13 adjacent to each other.

As shown in FIG. 3, first slopes 17 are inclined at inclination angle $\theta a$ with respect to the imaginary plane. On the other hand, second slopes 18 are inclined at inclination angle $\theta b$ with respect to the imaginary plane.

Projection rows 13 are formed on emission face 4 overall. A portion of inner propagation light of light guide plate 2 is inner-incident to first slopes 17 on the way of travelling toward distal end face 20 from incidence end face 3. According to well-known optical theory, some of the inner-incident light escapes from light guide plate 2 if inner-incidence angle on being inner-incident is not greater than critical angle.

Inclination of first slopes 17 at inclination angle $\theta a$ reduces inner-incidence angle. That is, light escaping (i.e. outgoing) occurs more easily as compared with cases where no first slopes 17 are formed (namely, cases of horizontal face). In other words, first slope 17 has a emission promotion function.

In addition, as to light inner-reflected by first slope 17, inner-reflection occur at an angle greater by $2\theta a$ as compared with in cases where reflection occurs at non-inclined emission face 4 (i.e. imaginary plane) 4 (See FIG. 3).

Therefore, inner-incidence angles at inner-reflection at another first slope 17 after reflection at back face 7 are apt to become small. This promotes further emission.

In general, the larger is inclination angle $\theta a$ of first slope 17, the stronger comes emission promotion. Therefore, if inclination angle $\theta a$ varies in a suitable angle range, emission ability can be controlled. This is a basic principle of the present invention.

It is general, however, that practical values of inclination angle $\theta a$ are not greater than 20°. Although adjusting (i.e. varying) of inclination angle $\theta a$ may be applied to the whole are of emission face 4, an "exceptional area(s)" may be set in periphery portion of emission face 4, such as vicinity of incidence end face 3 or distal end face 20.

Here, for the sake of explanation, an area obtained by removing such a exceptional area(s) from the whole area of emission face 4 (or back face 7) is called "main area". Setting of no exceptional area may be employed. In such cases, the whole area of emission face 4 (or back face 7) becomes "main area".

It can be said that a main area is "an area in which abnormal emission due to light leaking or other the like does not occur". As mentioned above, in many cases, portions extremely near to incidence end face 3 and distal end face 20 are not utilized for illumination effectively, being adopted as exceptional areas.

As described later, first region L1 and second region L2 are set in this "main area". An intermediate region may be set between first region L1 and second region L2. Such an intermediate is called "third region". The main area is the area covered by such first region L1 though third region. Third region L3 ((See FIG. 3) may not exist. It is noted that "third region" and "exceptional area(s)" are not is omitted in FIG. 3 (, corresponding to cases of absence of third region L3 and exceptional area).

In this embodiment, inclination angle $\theta a$ varies within a predetermined angle range in the main area. Various angle ranges may be employable. Examples of them are Examples 1 to 3 below.

Example 1; $0°<\theta a<20°$: This is a generally preferably range.
Example 2; $0°<\theta a<10°$: This is a more preferably range.
Example 3; $0.05°<\theta a<5°$: This is a still more preferably range.

In general, it is preferable to determine the optimum range of variation of inclination angle $\theta a$ depending on factors such as size of light guide plate (distance from incidence end face 3 to distal end face 20 (light guiding distance)), plate thickness at incidence end face 3, thickness at distal end face 20 and emitting characteristics of primary light source.

As mentioned previously, in a portion extremely near to incidence end face 3, light entered through incidence end face 3 hardly reach emission face 4. Therefore, no projection row 13 may be formed in this area. If projection row(s) 13 is formed in this area, light inner-incident to emission face 4 in this area is subject to a special effect by projection row(s) 13.

Figure 2B:
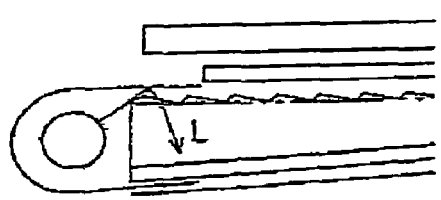

As shown in FIG. 2b, a small quantity of light L is incident through any part other than incidence end face 3. Such light L incident to first slope 17 or second slope 18 of projection row 13 located extremely near to incidence end face 3 after travelling through a gap between incidence end face 3 and lamp reflector 11. For the sake convenience, such incident light called "abnormal incident light". Light paths of abnormal incident light are strikingly different from those of light incident through incidence end face 3.

In an area extremely near to incidence end face 3, abnormal incident light in an area extremely near to incidence end face 3 likely to spoil emission intensity (brightness) control by adjusting inclination angle of first slope 17 (i.e. a basic effect of the present invention). This, in many cases, such "area extremely near to incidence end face 3," is set as an exceptional area.

On the other hand, in an area extremely near to distal end face 20, light inner-reflected by distal end face 20 is apt to be emitted through second slope(s) 18 of projection row(s) 13 located this neighbouring area. Such emitted light is likely to disturb emission intensity distribution (brightness distribution). Exception from main area is applied. This, in many cases, such "area extremely near to distal end face 20" is also set as an exceptional area.

In addition, such "area extremely near to incidence end face 3" and "area extremely near to distal end face 20" are areas in which emission directivity is apt to be disturbed. That is, these areas are likely to look remarkably bright on being viewed from directions largely deviated (for example, 30° or more) from a frontal direction of emission face 4. An example of main area is described below.

Now provided is a case where a display of a personal computer has a size of about 15 inches. Size of light guide plates employed in surface light source devices for such a display is also about 15 inches. In this case, an example of "area extremely near to incidence end face 3" is "an area distant from incidence end face 3 by not greater than 5 mm". Further, an example of "area extremely near to distal end face 20" is "area distant from distal end face 20 by not greater than 10 mm". Needless to say, however, such sizes of exceptional areas change to some extent depending on thickness or size of light guide plate. No exceptional area may be set.

As mentioned previously, first region L1 and second region L2 are set in a main area. Inclination angle θa decreases gradually away from incidence end face 3 in first region L1 while increasing gradually away from incidence end face 3 in second region L2.

In addition, at an end portion of first region L1 on the side of incidence end face 3, inclination angle θa has a value that is larger than a value which inclination angle θa has at an end portion of second region L2 on the side of distal end face 20.

Further, variation Δ(1)θa of inclination angle θa within first region L1 is greater than variation Δ(2)θa of inclination angle θa within second region L1.

In this embodiment, first slopes 17 are formed as to satisfy these conditions. In other words, emission promotion function of projection rows 13 in first region L1 is stronger than that of projection rows 13 in second region L2. This prevents short of emission intensity, which tends to appear in an area relatively near to incidence end face 3, from appearing.

In addition, the above-described variation (gradation) of inclination angle θa also prevents short of emission intensity, which tends to appear in an area relatively near to distal end face 20, from appearing. It is noted that emission occurs relatively with ease at boundary between first region L1 and second region L2 and around the boundary. Therefore, projection rows 13 formed at boundary between first region L1 and second region L2 and around the boundary are provided with a relatively weak emission promotion function through the above variation (gradation) of inclination angle θa.

It is preferable that second slopes 18 have inclination angle θb such that light guided from incidence end face 3 to distal end face 20 is hardly incident to second slopes 18. In addition, inclination angle θb of second slope 18 is preferably determined under considering a relation between light emitted from first slope 17 and inner propagation light, as illustrated in FIGS. 4 and 5. That is, it is preferable that inclination angle θb is determined as too enable to prevent a dark portion (See hatched portion in FIG. 5b) which bright by second slope 18 from appearing.

Now calculated is inclination angle θb suitable for preventing second slopes 18 from bringing dark portions. It is noted that refractive index of air (exterior of light guide plate 2) is equal to 1. In addition, n, θa, θb, ω, φ, θin and θout used in formulae below are defined as follows.

θb; Angle of second slope 18 with respect to 4

θout; Angle of a direction of ray (called "main ray, hereafter) corresponding to the strongest emission from first slope 17 (i.e. main emission direction) with respect to normal 22 of emission face 4.

ω; Angle of travelling direction of inner propagation light corresponding main ray with respect to emission face 4.

φ; Angle of travelling direction of inner propagation light corresponding main ray with respect to normal 23 of first slope 17.

θin; Angle of travelling direction of inner propagation light corresponding main ray with respect to normal 22 of emission face 4.

In the first place, the following formula (1) is established based of Snell's Law.

$$n \cdot \sin\phi = \sin(\theta out - \theta a) \quad (1)$$

Next, angle φ can be expressed by the following formula (2).

$$\phi = \sin^{-1}[\sin(\theta out - \theta a)/n] \quad (2)$$

In addition, angle ω can be expressed by the following formula (3).

$$\omega = 90° - (\phi + \theta a) \quad (3)$$

Now provided is a case such that angle ω equal to angle θb, a light path of main ray is located in the vicinity of boundary between first slope 17 and second slope 18 as illustrated in FIG. 5a.

That is, this brings main ray Q2 which is extremely near to and parallel with main ray Q1 which is emitted as to almost touch top portion 24 forming a ridge line of triangle-like projection row 13. Therefore, dark portions are hardly caused by second slope 18. It is noted that rays P1, P2 are inner propagation light rays corresponding to main rays Q1, Q2, respectively, travelling in parallel.

As shown in FIG. 5b, if angle θb is excessively larger than angle ω or, inversely, excessively smaller than angle ω, a dark portion apt to appear.

Described on a case where angle θb is excessively larger than angle ω, by referring to FIG. 5b.

Main ray Q4 exist as to be adjacent to main ray Q3 which is emitted as to almost touch top portion 24 forming a ridge line of triangle-like projection row 13. However, there is a remarkable gap (See hatched portion) between main ray Q4 and main ray Q3 because main ray Q4 is given by inner propagation light pass valley bottom. The larger is inclination angle θb, the larger the gap is.

If inclination angle θb is too small as compared with angle ω, a dark portion is apt to appear, too, since inner-incident light to second slope 18 is subject to total reflection.

From results of the above study, a condition for avoiding dark portions from appearing is given by the following formula (4).

$$\theta b = \omega \quad (4)$$

The following formula (5) is obtained by rewriting formula (4) with the use of formulas (2) and (3).

$$\theta b = 90° - \sin^{-1}[\sin(\theta out - \theta a)/n] - \theta a \quad (5)$$

If inclination angle θa of second slope 18 with respect to emission face 4 is set as to satisfy the above formula (5), Light emitted from first slope 17 in a main emission direction can avoid from being incident to second slope 18. As a result, dark portions are prevented from appearing. It is noted that the followings show an example of calculated concrete values.

n=1.49

θa=1°

θout=70°

Putting these data into the above formula (5),

θb=about 50.2° is obtained.

Actually, however, emission occurs under an angle range near to angle ω, although light intensity thereof is reduced somewhat. Therefore, Second slopes 18 may be formed so that inclination angle θb ranges expanded to larger size and smaller side, as compared with the above angle θb. That is, it is allowed to form second slopes 18 are as to bridge two first slopes 17 under consideration such that first slopes 17 are formed most of inner propagation light is incident to first slopes 17.

Figure 6:
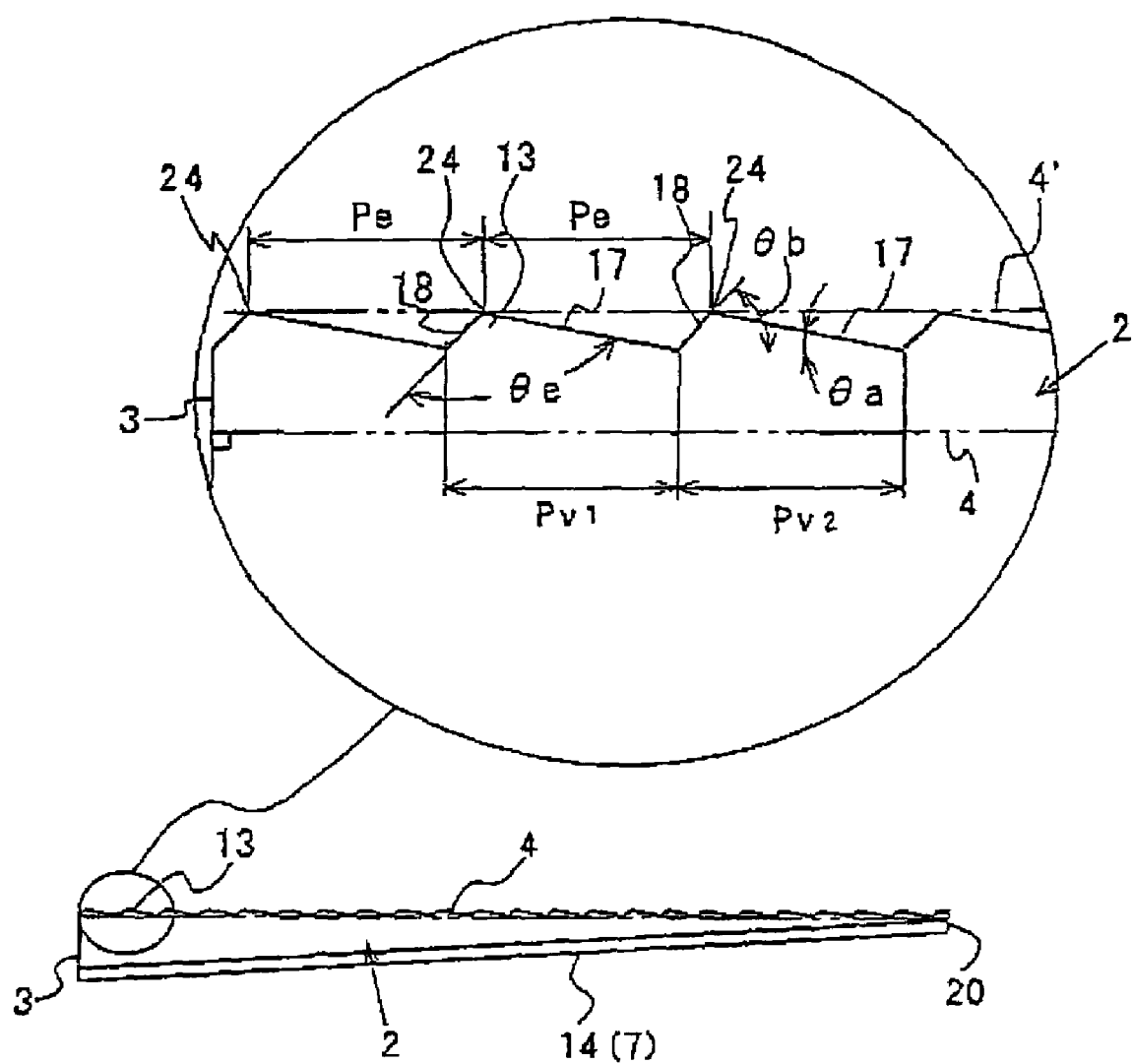
FIG. 6 illustrates a light guide plate formed by utilizing a first injection molding method.
Figure 7:
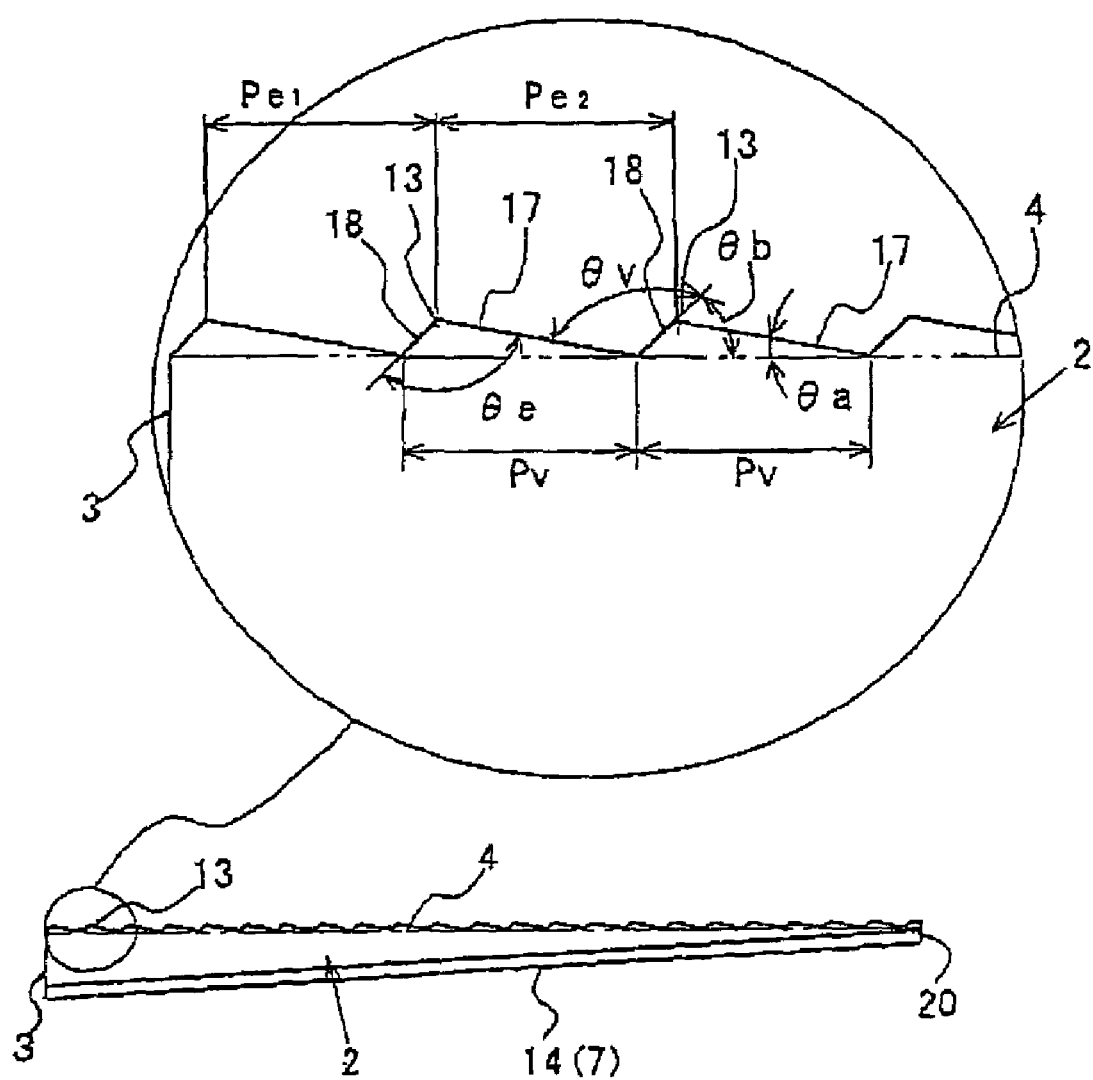
FIG. 7 illustrates a light guide plate formed by utilizing a second injection molding method.

FIG. 6 illustrates light guide plate 2 formed by utilizing a first injection molding method and FIG. 7 illustrates light guide plate 2 formed by utilizing a second injection molding method. These light guide plates 2 give the same relation θa=f(X) between inclination angle θa and distance X from incidence end face 3. But these light guide plates 2 are different from each other in points other than inclination angle θa as follows.

In the case of light guide plate 2 shown in FIG. 6, inclination angle θa and opening angle θv of valley portions formed between two projection rows 13 adjacent to each other vary. Projection rows 13 have a constant vertical angle θe. Such light guide plate 2 can be produced by transferring surface configuration of a mold to which cutting is applied with a bite of an angle generally the same as vertical angle θe. In addition, light guide plate 2 shown in FIG. 6 has a constant pitch Pe between projection rows 13, 13. Further, height of projection row 13 is adjusted so that pitch Pe between projection rows 13, 13 is kept constant.

Next, in the case of light guide plate 2 shown in FIG. 7, inclination angle δa and vertical angle θe of projection rows 13 vary. Opening angle θv of valley portions between projection rows 13, 13. Such light guide plate 2 is produced, for example, as follows, First, a die is produced by transferring the surface configuration of the mold above-mentioned in description on light guide plate 2 shown in FIG. 6, Transferring this doe to resin, light guide plate 2 as shown in FIG. 7 which is inversely configured as compared with light guide plate 2 shown in FIG. 6.

Light guide plate 2 shown in FIG. 7 has a constant pitch Pv between ridge lines, across valley portions respectively, of projection rows 13, 13 adjacent to each other. In addition, projection rows 13 are formed so that lines formed by bottom of valley portions between projection rows 13, 13 (i.e. valley bottom lines) extend on the same plane.

It is to be noted, however, that such conditions other than variation of inclination angle θa (pitch Pe of top portions (ridge lines) 24, pitch Pv of valley bottom lines (valley portions), vertical positions of lines 14 and valley portions, vertical angle θe, opening angle θv of valley portions) do not limit the scope of the present invention.

These conditions may be adjusted as required under consideration of easiness of machining or molding, degree of fitness to other members (such as relation with respect to imaging pitch of liquid crystal display panel 6 employed in image display 1) etc. For example, pitch Pe or pitch Pv may be adjusted appropriately to cause top portions (ridge lines) 24 and valley bottom lines to be not conspicuous on a light emitting surface of surface light source device 12.

Further, pitch Pe or pitch Pv may be adjusted as to avoid Moire stripes from appearing depending on relation with respect to imaging pitch of liquid crystal display panel 6 of surface light source device 12 employed in image display 1.

Inner propagation light of light guide plate 2 structured as above-described travels as to approach distal end face 20 as to be undergo repeatedly inner-reflection at first slope 17 and slopes 15, 16 of prismatic projection rows 14 on back face 7. On the way of such process, some part of the light which is inner-incident to first slope 17 at an angle not greater than critical angle is emitted from light guide plate 2 to the exterior.

By the way, projection rows 13 have inclination angle θa increasing gradually in first region L1 as approaching incidence end face 3 away from distal end face 20, being provided with increasing emission promotion function correspondingly. As a result, inner propagation light tends to urged to be emitted correspondingly.

Further, in second region L2, inclination angle θa increases gradually as approaching distal end face 20 away from incidence end face 3. As a result, inner propagation light tends to urged to be emitted correspondingly, being provided with increasing emission promotion function correspondingly.

Such "gradation given to emission promotion function enables to prevent easily short of emission intensity in the vicinity of incidence end face 3 and distal end face 20, which has been difficult to be overcome, from being brought. It is noted that escaping of inner propagation light from emission face 4 is promoted depending on inclination angle α On of back face 7 of light guide plate 2 according to a known effect, because inclination of back face 7 is given so that thickness tends to be reduced with decreasing distance from distal end face 20.

In addition, prismatic projection rows 14 formed on back face 7 of light guide plate 2 gathers inner propagation light as to come near to a frontal direction of emission face 4, as mentioned previously. Light gathered in such a way is inner-incident to first slope 17 without involving disturbance of directivity and a remarkable part of the inner-incident light is emitted through first slopes 17.

Within light guide plate 2, toward incidence end face 3 from distal end face 20 travels a great part of light inner-reflected distal end face 20 and light which has re-entering through distal end face 20 after outgoing through distal end face 20 and being reflected by a frame not shown or the like. Such light is called "returning light".

Some of returning light is inner-incident to second slope 18 at angles not greater than critical angle and a part of the inner-incident light is emitted through second slopes 18. It is noted that light gathering effect of prismatic projection rows 14 on back face 7 is also effective to returning light.

Embodiment 1

Figure 8:
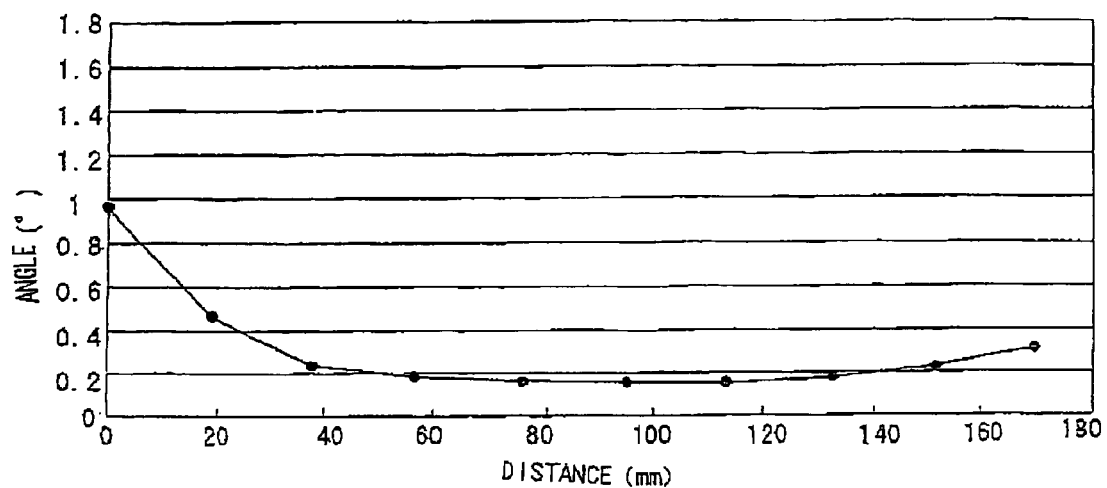
FIG. 8 is a graph showing a relation between distance from an incidence end face of a light guide plate employed in Embodiment 1 in accordance with the present invention (abscissa) and inclination angle θa of first slope of a projection row (ordinate)

FIG. 8 illustrates light guide plate 2 employed in Embodiment 1. It is noted that basic structure of light guide plate 2 is shown in FIG. 3, the following description is given on the basis of FIGS. 3 and 8. In addition, light guide plate 2 is used for supply emission light to a liquid crystal display panel having a size of 12.1 inches. Distance from incidence end face 3 to distal end face 20 is 190 mm and distance between both side faces perpendicular incidence end face 3 is 250 mm.

Light guide plate 2 has a plan shape of a rectangle sizing 250×190 mm, being made of PMMA and produced by utilizing injection molding. Thickness of light guide plate 2 falls gradually from 2.0 mm to 0.7 mm away from incidence end face 3 to distal end face 20. Inclination angle α of back face 7 is 0.39°. Pitch Pe or Pv of prismatic projection rows 13 is 0.083 mm and vertical angle θe of projection rows 13 or opening angle θv of bottoms between projection rows 13 is 134° ((See FIG. 6 or 7).

Figure 9:
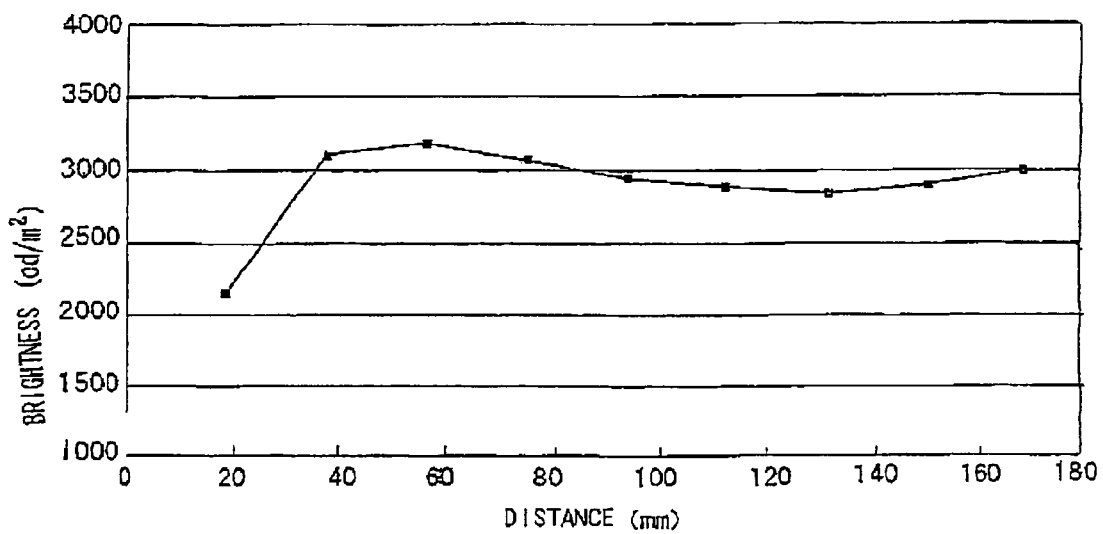
FIG. 9 is a graph showing a relation between distance from an incidence end face of the light guide plate employed in Embodiment 1 in accordance with the present invention (abscissa) and emission brightness (ordinate)

Relations shown in FIGS. 8 and 9 give inclination angles θa of first slope 17 and emission brightness at predetermined values of distance from incidence end face 3.

It is noted that "distance (mm) from incidence end face 3" and "distance (mm)" in FIGS. 8 to 13 and description hereafter give distance X from an end, which is near to incidence end face 3, of a main area. In FIGS. 3 and 8, first region L1 corresponds to a range of X=0~95 mm. On the other hand, second region L2 corresponds to a range of X=110~170 mm.

Inclination angle θa decreases gradually in first region L1 away from incidence end face 3 toward distal end face 20 while increasing gradually in second region L2 away from incidence end face 3 toward distal end face 20. In first region L1, inclination angle θa=0.95° at X=0, falling rapidly and continuously to θa=0.22° in a range of distance X=0~40 mm.

Further, inclination angle θa falls gently and gradually in a range of distance X=40~95 mm, giving θa=0.22°~0.15°.

On the other hand, in second region L2, inclination angle θa increases gently in a range of distance X=110 mm~170 mm, giving θa=0.15°~0.31°.

It is noted that there is "third region L3" as forementioned between first region L1 and second region L2, in a distance range of X=95~110 mm, and inclination angle θa is substantially kept constant in the region. In this case, θa=0.15° (constant).

In contrast with such Embodiment 1, prior art light guide plates according to Document 1 have inclination angle θa of first slopes 117 of prismatic projection rows 113 fall gradually away from incidence end face 103 to distal end face 120, as shown in FIGS. 12 and 18. Inclination angle θa gradually falls in a distance range of 0~170 mm from an end of main region on the side of incidence end face 103, giving θa=1°~0.11°. It is noted that light guide plate 102 has the same basic structure as that of Embodiment 1 except for formation of prismatic projection rows 113. Inclination angle α of back face 107 is 0.39°.

Emission characteristics of light guide plate 102 are shown in FIG. 13. Referring to FIG. 13, emission intensity is kept constant approximately in a distance range of 38 mm~55 mm from the end of main area on the side of incidence end face 103. However, emission intensity falls in a distance range of 55 mm~170 mm from the end of main area on the side of incidence end face 103, toward distal end face 120, failing to provide a uniform brightness distribution.

To the contrary, light guide plate 2 employed in Embodiment 1 provides a higher uniformity of brightness as compared with light guide plate 102. That is, as shown in FIG. 9, emission intensity is kept constant approximately in a broad distance range of 38 mm~170 mm from incidence end face 3. Besides, a high brightness level is obtained.

An advantage is obtained by such an art of the present invention in which method gradual increasing of inclination angle θa after a gradual decreasing of inclination angle θa with an increasing distance from incidence end face 3 for uniformalizing brightness, That is, extremely thin light guide plate 2 requires back face 7 to have extremely small inclination angle α. This means that optimization of inclination angle α for uniformalize brightness is difficult. If the present invention is applied, this difficulty can be overcome by employing varying inclination angle θa Embodiment 2

Figure 10:
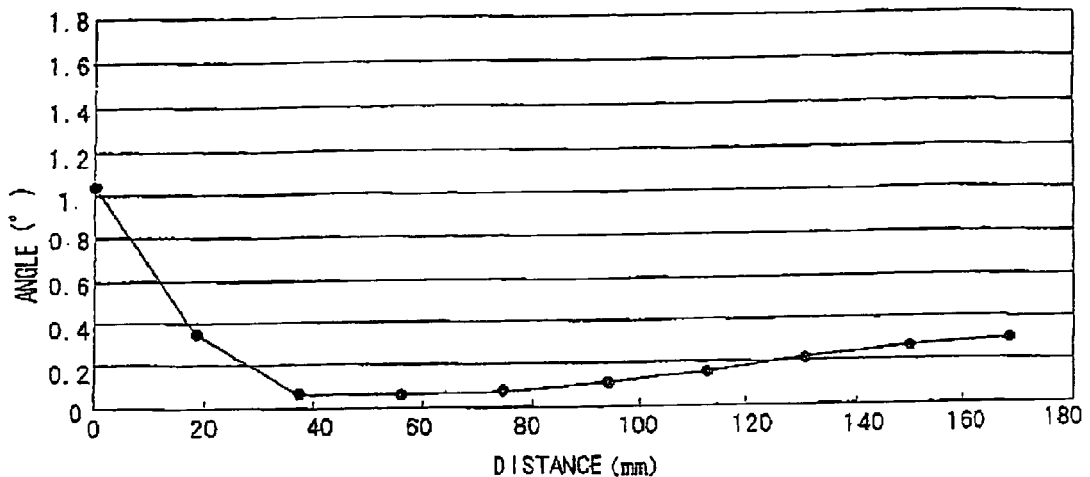
FIG. 10 is a graph showing a relation between distance from an incidence end ace of a light guide plate employed in Embodiment 2 in accordance with the present invention (abscissa) and inclination angle θa of first slope of a projection row (ordinate)

FIG. 10 illustrates light guide plate 2 employed in Embodiment 2 in accordance with the present invention. It is noted that basic structure of light guide plate 2 of Embodiment 2 is the same as that of Embodiment 1 except for formation of prismatic projection rows 13. As shown in FIGS. 3 and 10, inclination angle θa of first slopes 17 of light guide plate 2 ranges θa=1.05°~0.07° in a range of distance X=0 mm~40 mm, giving a rapid falling. Further, inclination angle θa is kept generally constant at 0.07° in a range of distance X=40 mm~55 mm, then ranges θa=0.07°~0.33° in a range of distance X=55 mm~170 mm, giving a gentle rising.

In other words, in Embodiment 2, first region L1 corresponds to a range of distance X=0 mm~40 mm and second region L2 corresponds to a range of distance X=55 mm~170 mm. Third region L3 corresponds to a range of distance X=40 mm~55 mm.

Figure 11:
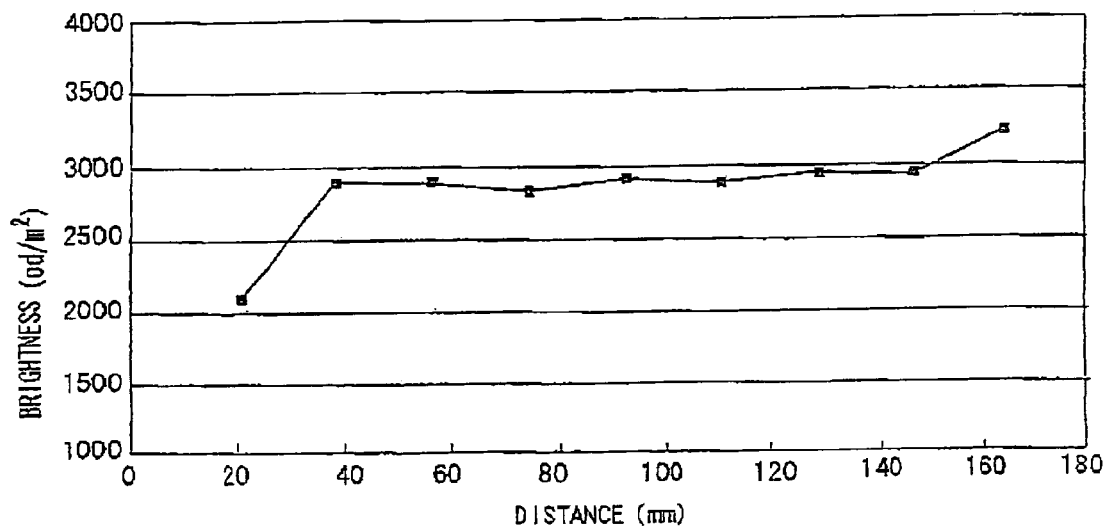
FIG. 11 is a graph showing a relation between distance from an incidence end face of the light guide plate employed in Embodiment 2 in accordance with the present invention (abscissa) and emission brightness (ordinate)

Light guide plate 2 of Embodiment 2 provides a higher brightness uniformity as compared with conventional light guide plate 2 shown in FIG. 12. That is, light guide plate 2 of Embodiment 2 keeps a high and uniform emission brightness in a broad distance range X=40 mm~170 mm as shown in FIG. 11.

(Light Control Member)

Structure and functions of prism sheet (light control member) 5 shown in FIG. 1 or 2, are known well. Prism sheet 5 is made of a light well-permeable resin material (such as PET, PMMA or PC). Plan shape and plan size thereof are generally the same as plan shape (rectangle) and plan size of emission face 4 of light guide plate 2, respectively. A great number of fine prismatic projection rows 36 running parallel to each other are formed on a face, opposite to emission face 4, of light guide plate 2. Each prismatic projection row 36 has a triangle-like cross section, ring in a direction generally parallel to a length direction of incidence end face 5.

Figure 14:
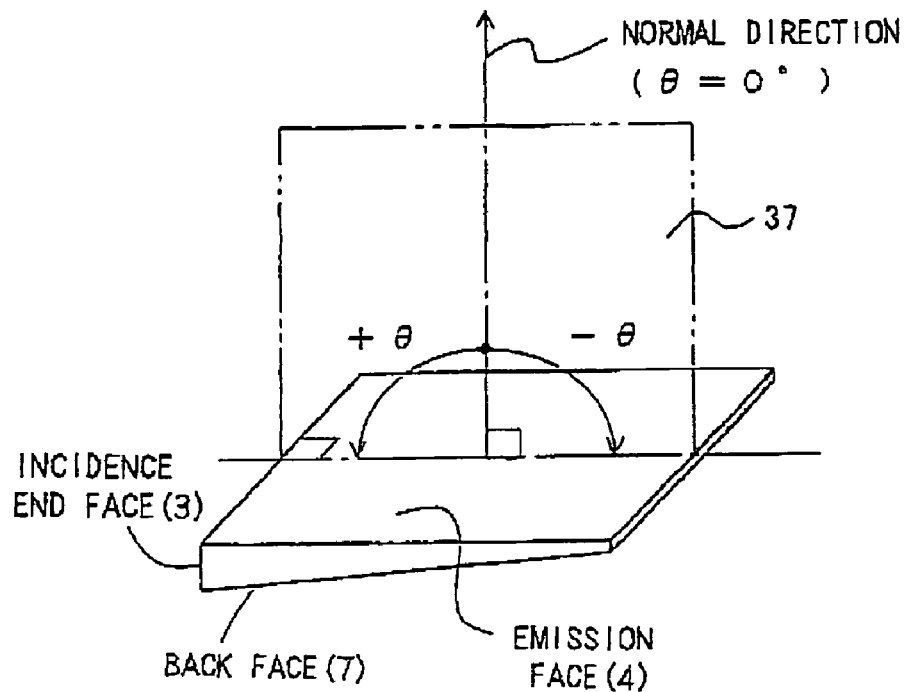
FIG. 14 is a diagramic perspective view of outward appearance of a light guide plate, giving explanation of emission characteristics.

According to a well-known function, prism sheet 5 deflects light emitted from emission face 4 as to come near to a generally normal direction of emission face 4 in imaginary plane 37 perpendicular to both incidence end face 3 and emission face 4 ((See FIG. 14). This causes liquid crystal display panel 6 to be illuminated efficiently (See FIG. 2).

(Reflection Member)

Reflectivity is given to a face, opposite to back face 7, of reflection member 8 shown in FIGS. 1, 2. For example, on this purpose, PET sheets containing white pigment, films on which light reflective layer such as aluminum or the like is evaporation-deposited are utilized. Plan shape and plan size of reflection member 8 are generally the same as plan shape (rectangle) and plan size of back face 7, respectively. Reflection member 8 reflects light which has leaked through back face 7 to return that into light guide plate 2. It is noted that reflection member 8 may be omitted. For example, if a housing (not shown) accommodating light guide plate 2 has a reflective inner surface, the inner surface can be utilized as reflection means instead of reflection member 8.

As understood from description on the above embodiment, according to a feature of the present invention, since variation manners of inclination angle θa of first slopes of prismatic projection rows 13 allows flexible setting, variation manners of inclination angle θa can be designed with ease. This comes from a fact that inclination angle θa of individual projection row 13 can be set freely.

If configuration of individual projection rows are fixed (constant inclination angle θa) and pitch (interval) of projection rows are varied, as done in cases of prior arts, to uniformize brightness, emission promotion ability of each one of projection rows 13 can not be adjusted, with the result that fine adjustment illumination brightness depending on position on an emission face is difficult <Modification 1>

Figure 15:
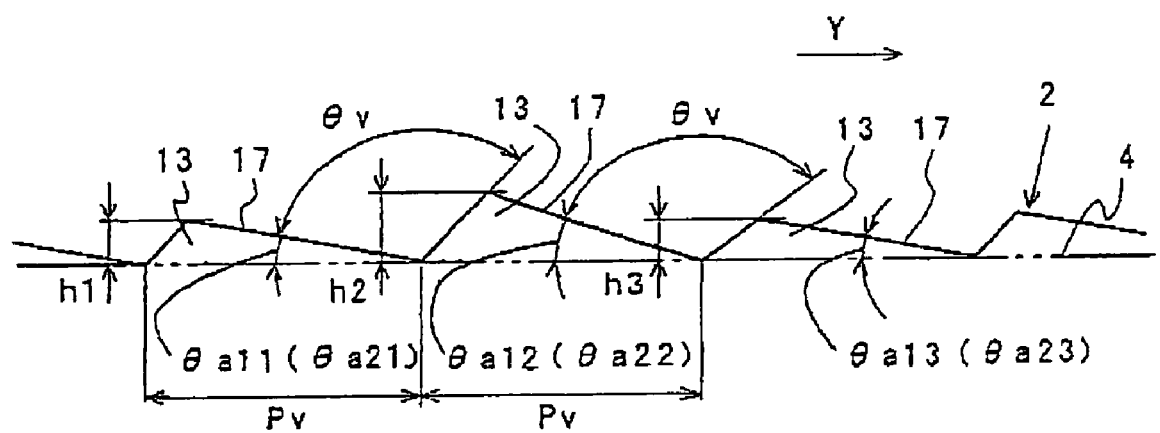
FIG. 15 is an enlarged view of a part of an emission face of a light guide plate, giving explanation on Modification 1 in accordance with the present invention.

FIG. 15 is an enlarged cross section view of emission face 4 of light guide plate 2 and a part of neighbourhood thereof for giving explanation on this Modification 1. Many projection rows 13 are formed on emission face 4 of light guide plate 2. Now attention is paid to "three projection rows 13 adjacent to each other" of projection rows 13. Height of three projection rows 13 adjacent to each other is called h1, h2 and h3 in order from the side of incidence end face 3. In addition, inclination angle θa of first slopes 17 thereof in first region L1 is called θa11, θa12, θa13. Further, average of them (θa11+θa12+θa13)/3) is called θm1.

On the other hand, inclination angle θa of first slopes 17 thereof in second region L2 is called θa21, θa22, θa23. Average of them (θa21+θa22+θa23)/3) is called θm2. In Modification 1, projection rows 13 are formed as to satisfy the following conditions.

(i) Many sets of three projection rows 13 adjacent to each are formed in first region L1 and second region L2 so that height of each set h1, h2, h3 from the side of incidence end face 3 satisfies h1<h2 and h2>h3, as shown in FIG. 15.

(ii) In first region L1, θm1 decreases gradually away from incidence end face 3. In second region L2, θm2 increases gradually away from incidence end face 3 (See FIGS. 8, 10, 13).

(ii) θm1 at an end, near to incidence end face 3, of first region L1 is larger than θm2 at an end, near to distal end face 20, of second region L2.

(iv) Variation range Δθm1 (difference between the maximum and the minimum) of θm1 in first region L1 is greater than variation range Δθm2 (difference between the maximum and the minimum) of θm2 in second region L2.

It is noted that θm1 and θm2 may be defined as averages of inclination angle θa of four or more projection rows adjacent to each successively instead of those of three projection rows 13 adjacent to each successively Alternatively, average of successive two projection rows 13 may be employed. It is practical, however, that number n of projection rows 13 for defining average is not too large. A practical range is 2≦n≦20, and a preferable range is 3≦n≦6. If n=6 six projection rows are formed as to occupy, for example, a width of 0.2 mm~2 mm. Occupation width of 2 mm corresponds to pitch of Pe=0.083 mm (constant). Pitch Pv between valley portions is also constant.

In modification 1, prism sheet 5 is prevented from sticking to emission face 4 since formed discretely are projection rows higher than both side adjacent projection rows 13 due to the above condition (i).

<Modification 2>

FIG. 16 is an enlarged cross section view of emission face 4 of light guide plate 2 and a part of neighbourhood thereof for giving explanation on this Modification 2. Many projection rows 13 are formed on emission face 4 of light guide plate 2.

As illustrated, light guide plate 2 of Embodiment 2 is a light guide plate obtained by modifying to the embodiment shown in FIGS. 1 to 3. This modification gives a flat portion (blank area) 38 without projection rows 13, at a certain interval (for example, for each three projection rows 13 adjacent to each) on emission face 4, In general, each flat portion 38 has a length along a direction from incidence end face 3 to distal end face 20 may be not subject to limitation. According to an example, the length is set at integer (k) multiple of pitch Pv between valley bottom lines of projection rows 13. An example of range of k (positive integer) is 10≦k≦500.

In addition, flat portions 38 (blank areas) 38 may be utilized to adjust emission brightness additionally. For example, somewhat more flat portions 38 may be formed in the vicinity of a center of emission face 4 for avoiding an excessive brightness from being provided there. Length size (length size along a direction from incidence end face 3 to distal end face 20) is determined preferably under consideration of influence on brightness characteristics. An example is range of 0.2 mm~2 mm.

>Other Modifications?

The present invention allows modifications as follows.

(I) Weak scattering ability may be given to surface of projection rows 13 or flat portions 38 by roughening the surface.

(II) Many projection rows 13 may be formed on back face 7 instead of on emission face 4. If so formed, prismatic projection rows 14 may be formed on emission face 4.

(III) A great number of prismatic projection rows 14 formed on back face 7 of light guide plate 2 may be omitted.

(IV) Height of prismatic projection rows 14 may vary with an increasing distance from incidence end face 3.

(V) Cross section shape of prismatic projection rows 14 may be modified. For example, wave-like shape may be employed. Convex shape varying as to get smoother with a decreasing distance from incidence end face 3 may be employed. Both or one of top portions and valley portions of triangle-like cross sections may be arc like.

(VI) Primary light source may be point-like light source having one or a plurality of LEDs.

(VII) Instead of prism sheet 5 or in addition to prism sheet 5, employable is a prism sheet having a face, opposite to an emission face, provided with many prismatic projection rows. In this case, both prism sheets have preferably extending directions of prismatic projection rows generally perpendicular to each other.

(VIII) A groove(s) or projection row(s) may be formed on a face on which prismatic projection rows 13 are formed so that the groove(s) or projection row(s) is located nearer to incidence end face 3 as compared with a main area and runs in a direction perpendicular to incidence end face 3.

(IX) In the above-described embodiments, areas such as side edge areas corresponding to non-emission part of fluorescent lamp 10 are apt to show emission tendency different from that of the other area. Therefore, for such areas showing special emission tendency, prismatic projection rows 13 of differently configured as compared with that of the present invention may be formed on emission face 4 or back face 7.

What is claimed is:

1. A light guide plate comprising:
   an incidence end face provided by a first minor face;
   a distal end face provided by a second minor face opposite to said incidence end face;
   an emission face provided by a first major face;
   a back face provided by a second major face opposite to said emission face, light incident to said incidence end face being emitted from said emission face on the way of propagating within said light guide plate,
   wherein a plurality of prismatic projection rows are formed on said emission face or said back face as to run across a light supply direction toward said distal end face from said incidence end face;
   each of said plurality of projection rows is formed of a first slope and a second slope which meet each other to provide a ridge line;
   said second slope is located nearer than said first slope to said incidence end face;
   said emission face or said back face on which said plurality of projection rows are formed is provided with a first region and a second region that is remote than said first region from said incidence end face; and,
   said first slope gives inclination angle θa with respect to an imaginary plane bridging valley lines of mutually adjacent projections of all said projections so that the following conditions 1 to 3 are satisfied,
      where condition 1 is that inclination angle θa decreases gradually in said first region according to an increasing distance from said incidence end face and increases gradually in said second region according to an increasing distance from said incidence end face,
      condition 2 is that inclination angle θa at the nearest position to said incidence end face in said first region is greater than inclination angle θa at the nearest position to said distal end face in said second region, and condition 3 is that variation $\Delta(1)\theta a$ of inclination angle $\theta a$ within said first region is greater than variation $\Delta(2)\theta a$ of inclination angle $\theta a$ within said second region.

2. A light guide plate in accordance with claim 1, wherein said plurality of projection rows provide a plurality of valley bottom lines formed at a constant interval between two projection rows which are included in said plurality of projection rows and located adjacent to each other.

3. A light guide plate in accordance with claim 1, wherein said plurality of projection rows provide a plurality of ridge lines formed at a constant interval.

4. A surface light source device comprising:
a light guide plate;
a primary light source; and
a light control member,
wherein said light guide plate is a light guide plate in accordance with claim 3,
said light control member disposed along said emission face of said light guide plate, and
said primary light source supplies light toward said incidence end face of said light guide plate.

5. An image display comprising:
a surface light source device; and
a member-to-be-illuminated illuminated by light outputted from said surface light source device,
wherein said surface light source device is a surface light source device in accordance with claim 4.

6. A surface light source device comprising:
a light guide plate;
a primary light source; and
a light control member,
wherein said light guide plate is a light guide plate in accordance with claim 1 or 2,
said light control member is disposed along said emission face of said light guide plate, and
said primary light source supplies light toward said incidence end face of said light guide plate.

7. An image display comprising:
a surface light source device; and
a member-to-be-illuminated illuminated by light outputted from said surface light source device,
wherein said surface light source device is a surface light source device in accordance with claim 6.

8. A light guide plate comprising:
an incidence end face provided by a first minor face;
a distal end face provided by a second minor face opposite to said incidence end face;
an emission face provided by a first major face; and
a back face provided by a second major face opposite to said emission face, light incident to said incidence end face being emitted from said emission face on the way of propagating within said light guide plate,
wherein a plurality of prismatic projection rows are formed on said emission face or said back face as to run across a light supply direction toward said distal end face from said incidence end face,
each of said plurality of projection rows is formed of a first slope and a second slope which meet each other to provide a ridge line,
said second slope is located nearer than said first slope to said incidence end face;
said emission face or said back face on which said plurality of projection rows are formed is provided with a first region and a second region that is remote than said first region from said incidence end face, and,
said first slope gives inclination angle $\theta a$ with respect to an imaginary plane bridging valley lines of mutually adjacent projections of all said projections so that the following conditions 4 to 6 are satisfied,
where condition 4 is that under definition such that $\theta a1$, $\theta a2, \ldots, \theta an$ are inclination angle angles $\theta a$ of n, where n is positive integer not smaller than 2, projection rows which are included in said plurality of projection rows and arranged successively and average inclination angle $\theta m$ is defined as $\{(\theta a1+\theta a2+\ldots \theta an)/n\}$, where average inclination angle $\theta m$ decreases gradually in said first region according to an increasing distance from said incidence end face and increases gradually in said second region according to an increasing distance from said incidence end face,
condition 5 is that under definition such that $\theta m(3)$ is defined as said average inclination angle $\theta m$ when n=3, $\theta m(3)$ for three projection rows located nearer than the other projection rows in said first region to said incidence end face is greater than $\theta m(3)$ for three projection rows located nearer than the other projection rows in said second region to said distal end face, and
condition 6 is that variation $\theta m(31)$ of said $\theta m(3)$ within said first region is greater than variation $\theta m(32)$ of said $\theta m(3)$ within said second region.

9. A surface light source device comprising:
a light guide plate;
a primary light source; and
a light control member,
wherein said light guide plate is a light guide plate in accordance with claim 8,
said light control member disposed along said emission face of said light guide plate, and
said primary light source supplies light toward said incidence end face of said light guide plate.

10. An image display comprising:
a surface light source device; and
a member-to-be-illuminated illuminated by light outputted from said surface light source device,
wherein said surface light source device is a surface light source device in accordance with claim 9.

* * * * *